(12) United States Patent
Vuorinen (10) Patent No.: US 11,248,954 B2
(45) Date of Patent: Feb. 15, 2022

(54) BACK-TO-BACK SPECTROMETER ARRANGEMENT

(71) Applicant: Gasmet Technologies Oy, Vantaa (FI)

(72) Inventor: Rami Vuorinen, Vantaa (FI)

(73) Assignee: GASMET TECHNOLOGIES OY, Vantaa (FI)

( * ) Notice: Subject to any disclaimer, the term of this patent is extended or adjusted under 35 U.S.C. 154(b) by 0 days.

(21) Appl. No.: 16/912,884

(22) Filed: Jun. 26, 2020

(65) Prior Publication Data

US 2020/0408596 A1    Dec. 31, 2020

(30) Foreign Application Priority Data

Jun. 27, 2019   (FI) ..................... 20195572

(51) Int. Cl.
*G01J 3/02*      (2006.01)
*G01J 3/42*      (2006.01)
*G01J 3/45*      (2006.01)

(52) U.S. Cl.
CPC ............. *G01J 3/0286* (2013.01); *G01J 3/021* (2013.01); *G01J 3/42* (2013.01); *G01J 3/45* (2013.01)

(58) Field of Classification Search
None
See application file for complete search history.

(56) References Cited

U.S. PATENT DOCUMENTS

| 5,406,090 | A | 4/1995 | Mattson et al. |
| 7,151,260 | B2 | 12/2006 | Markham et al. |
| 7,236,243 | B2 | 6/2007 | Beecroft et al. |
| 7,242,508 | B2* | 7/2007 | Salomaa ................. G01J 3/108 359/238 |
| 9,279,721 | B2 | 3/2016 | Krause et al. |
| 2003/0087456 | A1* | 5/2003 | Jones ................... A61B 5/0059 436/171 |
| 2006/0050281 | A1* | 3/2006 | Salomaa ................. G01J 3/108 356/452 |

(Continued)

FOREIGN PATENT DOCUMENTS

JP    6-56734    8/1994

OTHER PUBLICATIONS

Search Report issued in EP Appln. No. 20182140.2 dated Nov. 3, 2020.

(Continued)

*Primary Examiner* — Shawn Decenzo
(74) *Attorney, Agent, or Firm* — Nixon & Vanderhye PC (57) ABSTRACT

According to an aspect, there is provided a spectrometer comprising a first and second enclosed volumes. The second enclosed volume is formed by an absorption cell for containing a sample gas. The first enclosed volume of the spectrometer comprises an interferometer with a source of electromagnetic radiation, a first focusing mirror adapted to focus electromagnetic radiation received from the interferometer to the absorption cell, a second focusing mirror adapted to focus electromagnetic radiation received from the absorption cell and a detector adapted to detect electromagnetic radiation focused by the second focusing mirror. Moreover, the spectrometer comprises a main frame plate on which elements in the first enclosed volume are mounted and which is fixed to the absorption cell arranged on an opposing side of the main frame plate.

11 Claims, 5 Drawing Sheets

(56) References Cited

U.S. PATENT DOCUMENTS

| | | | |
|---|---|---|---|
| 2006/0102844 A1 | 5/2006 | Sauer et al. | |
| 2007/0242275 A1* | 10/2007 | Spartz | G01N 21/45 356/451 |
| 2010/0079764 A1* | 4/2010 | Spartz | G01N 21/031 356/451 |
| 2013/0188170 A1* | 7/2013 | Wilkins | G01N 21/255 356/51 |
| 2013/0335734 A1* | 12/2013 | Krause | G01J 3/0267 356/246 |
| 2014/0333756 A1* | 11/2014 | Sogo | B23K 11/115 348/90 |
| 2015/0185075 A1* | 7/2015 | Krause | G01N 21/11 356/246 |
| 2015/0192468 A1* | 7/2015 | Pearman | H04B 1/406 356/451 |
| 2016/0003676 A1* | 1/2016 | Fukuda | G01J 3/0275 250/339.08 |
| 2019/0011357 A1* | 1/2019 | Kato | G01J 3/28 |
| 2019/0017873 A1 | 1/2019 | Spartz et al. | |

OTHER PUBLICATIONS

Wishnow et al., "Cryogenic multiple reflection absorption cell and Fourier transform spectrometer system for the far infrared" *Review of Scientific Instruments*, vol. 70, No. 1: 23-31 (Jan. 1999).

Wolfgang et al., "Lightweight diode laser spectrometer CHILD (Compact High-altitude In-situ Laser Diode) for balloonborne measurements of water vapor and methane" *Applied Optics*, vol. 44, No. 1 : 91-102 (Jan. 1, 2005).

Search Report issued in FI Appln. No. 20195572 dated Jan. 16, 2020.

Nikula, "Emission Measurement with Gasmet FTIR" Thesis, Centria University of Applied Sciences, Finland (Mar. 2016) (w/ abstract).

MATRIX-MG Series, Automated High-Performance Gas Analyzers, Bruker Optics (2017).

* cited by examiner

Fig. 3C

BACK-TO-BACK SPECTROMETER ARRANGEMENT

This application claims priority to FI Patent Application No. 20195572 filed Jun. 27, 2019, the entire contents of which are hereby incorporated by reference.

TECHNICAL FIELD

The invention relates to interferometry and spectrometry.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Infrared spectroscopy is a sub-discipline of spectroscopy based on employing electromagnetic waves in the infrared frequency range which corresponds to wavelengths larger than wavelengths of visible light. According to one definition, the infrared radiation has a wavelength range of 700 nm-1 mm (or frequency range of 300 GHz-430 THz). Infrared spectroscopy is based on the fact that different molecules interact differently with infrared radiation of a particular frequency. Specifically, each molecule has a set number (infrared) resonant frequencies at which a particular resonant vibration mode of the molecule is excited and consequently a maximum in the absorption of infrared radiation occurs. By taking advantage of knowledge of characteristic behavior of different molecules, infrared spectroscopy may be used for identifying and analyzing solid, liquids and/or gasses by studying the changes that occur in the infrared signal as it radiates in the sample solid, liquid or gas.

Fourier transform infrared spectroscopy is one commonly used measurement technique in infrared spectroscopy. In Fourier transform infrared spectroscopy, infrared radiation (or infrared light) is guided through an interferometer and subsequently through a sample (e.g., a gas sample) or vice versa. A moving mirror inside the interferometer is used to alter the frequency distribution of infrared light that passes through the interferometer. By moving said mirror and capturing the signal propagating through the sample, an interferogram of the sample describing absorption in the sample as a function of mirror position is captured. The spectrum of the sample under analysis (that is, absorption in the sample as a function of frequency) may be subsequently calculated based on the interferogram (and a reference interferogram for the spectrometer) and based thereon the sample may be identified.

As Fourier transform infrared spectroscopy is based on inducing phase shifts between two infrared signals having wavelengths below one millimeter in a controlled manner, it is obvious that even relatively minor misalignments or shifts in infrared optical elements in the interferometer may cause significant deterioration in the performance. Such minor misalignments or shifts may be caused, for example, by temperature variations and vibrations in the spectrometer. While good performance may be easily achieved in controlled laboratory conditions, it is not always convenient and efficient to bring the samples to such a controlled environment. Instead, the analysis of the sample may need to be carried out in less than ideal field conditions such as in a factory or a power plant. On the other hand, the sample gasses may be measured at a high temperature which may result in considerable thermal expansion of the body of the spectrometer causing further inaccuracies in the measurement results. Therefore, there is a need for robust Fourier transform infrared spectrometer solutions which enable sample analysis under varying conditions.

BRIEF DESCRIPTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1A:
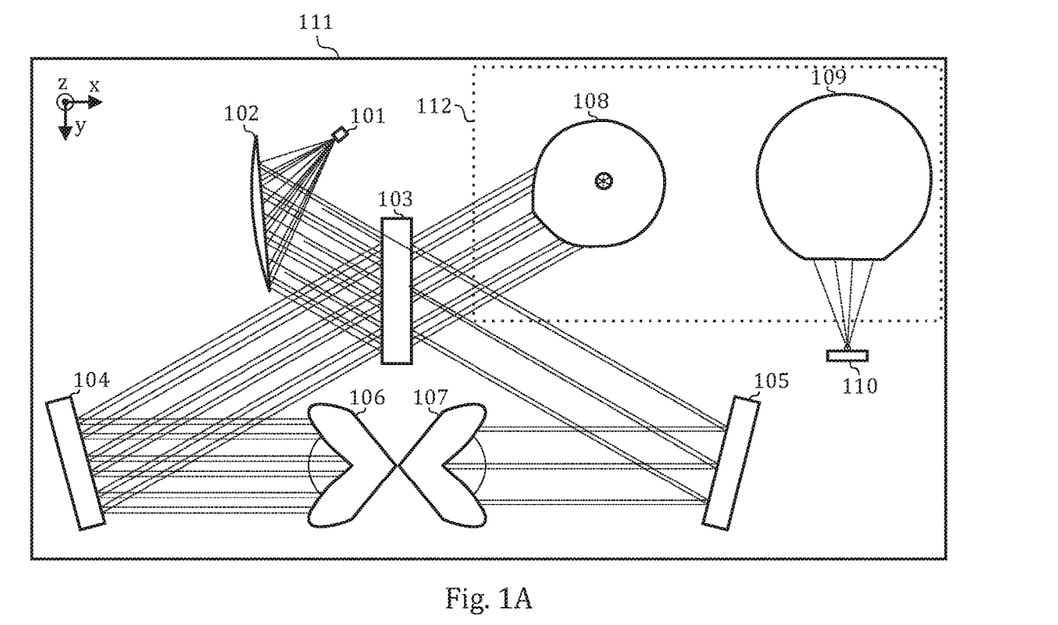
FIGS. 1A and 1B illustrate an apparatus according to embodiments from different angles.
Figure 1B:
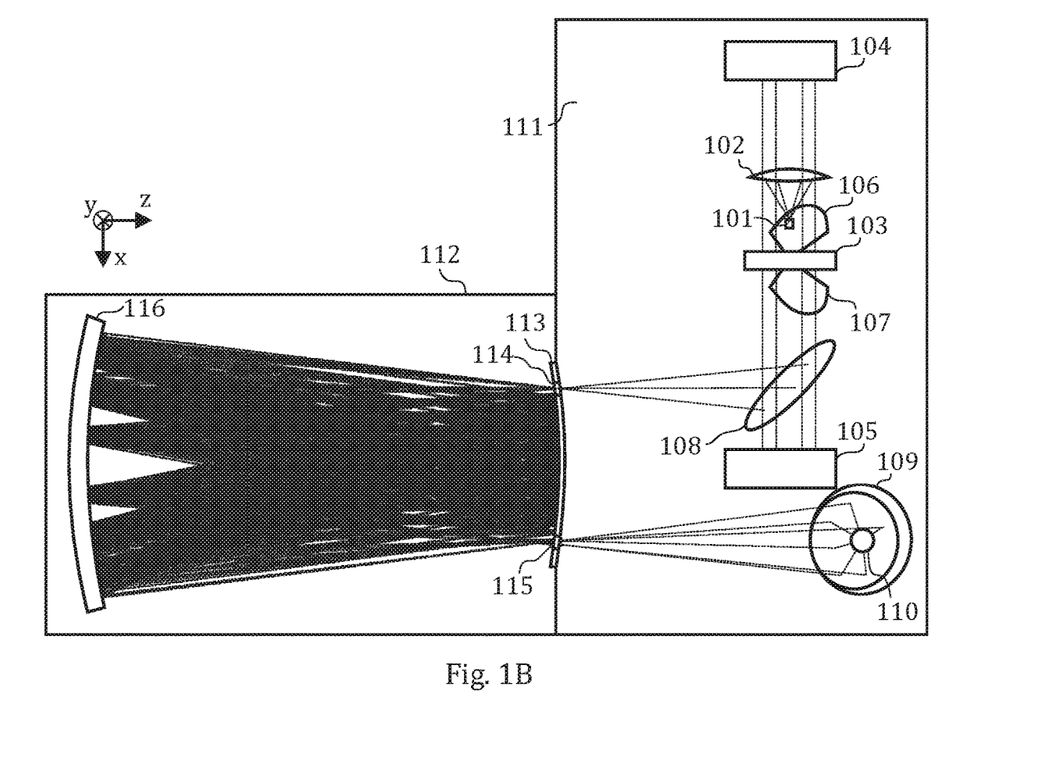

FIGS. 1A and 1B illustrate schematic diagrams of an apparatus (a spectrometer or a gas analyzer) according to embodiments. While the illustrated diagrams are predominantly schematic in nature meaning that only elements necessary for the optical operation of the spectrometer are illustrated (that is, aspects such as mechanical mountings and detailed geometry of elements are omitted), it should be noted the arrangement of the elements relative to each other corresponds to a physical implementation according to an embodiment (to be discussed in detail in relation to FIGS. 3A, 3B and 3C). FIGS. 1A and 1B illustrate the same schematic diagram from two different points of view: FIG. 1A shows a view of the xy-plane and FIG. 1B shows a view of the xz-plane. Exemplary non-limiting examples of beams of infrared light propagating in the spectrometer are shown with dashed lines.

Referring to FIGS. 1A and 1B, the illustrated apparatus may be considered to comprise four different units: an interferometer comprising elements 101 to 107, a focusing unit comprising elements 108, 109, an infrared absorption cell 112 and an infrared detector 110. In the schematic illustrations of FIGS. 1A and 1B, the element 112 may be considered to represent equally the absorption cell and/or the second enclosed volume formed by the absorption cell. The interferometer, the focusing unit and the infrared detector 110 may be arranged in a first enclosed volume 111 isolated from a second enclosed volume formed by the absorption cell 112. Specifically, the first and second enclosed volumes 111, 112 may be isolated so that (sample) gas contained in the second enclosed volume 112 is unable to flow from the second enclosed volume 112 to the first enclosed volume 111 (and vice versa). In other words, gas flow between the first enclosed volume 111 and the second enclosed volume 112 is prevented. It should be noted that the absorption cell 112 is drawn in FIG. 1A with a dotted line so as to indicate that the absorption cell 112 is located behind or under the first enclosed volume 111 (i.e., separated from it along z-direction), as is illustrated in FIG. 1B.

The interferometer of the illustrated apparatus comprises an infrared light source 101, a collimating mirror 102, a beam splitter 103, a first plane mirror 104, a second plane mirror 105, a first cube corner mirror 106 and a second cube corner mirror 107. The interferometer is employed for modulating infrared light in a controlled manner. To this end, the interferometer may be equally called an infrared modulator. In other embodiments, another interferometer configuration may be employed.

The infrared light source 101 emits infrared light (i.e., infrared radiation) to a direction of the collimating mirror 102. The infrared light emitted by the infrared light source 101 may have a spectral output fully or partly within the infrared frequency range (300 GHz-430 THz). The infrared light source 101 may be a non-collimated infrared light source or a collimated infrared light source.

The collimating mirror 102 collects infrared light emitted by the infrared light source 101 and directs it towards the beam splitter. As its name implies, the collimating mirror 102 collimates the infrared light, so that all rays of infrared light travel to the beam splitter 103 parallel to each other. In embodiments where the infrared light source 101 is a collimated infrared red light source, the collimating mirror 102 may be omitted and the infrared light source may direct emitted collimated infrared light directly (or via one or more plane mirrors) to the beam splitter 103.

The beam splitter 103 splits collimated infrared light from the infrared light source 101 to a first beam and a second beam. Specifically, said first beam may be directed towards the first plane mirror 104 and said second beam may be directed towards to the second plane mirror 105. One of the first and second beams may be a beam transmitted through the beam splitter 103 and the other may be a beam reflected from the beam splitter 103. Conversely, the beam splitter 103 is adapted to split infrared light reflected from the first mirror 104 towards the beam splitter 103 to a third beam and a fourth beam one of which (specifically, the beam transmitted through the beam splitter 103) is directed towards a first focusing mirror 108. Similarly, the beam splitter 103 is also adapted to split infrared light reflected from the second plane mirror 105 towards the beam splitter 103 to a fifth beam and a sixth beam one of which (specifically, the beam reflected from the beam splitter 103) is directed towards the first focusing mirror 108. In some embodiments, the alignment and/or orientation of the beam splitter may be adjusted.

The first and second plane mirrors 104, 105 are (fixedly and/or nonadjustably) arranged and aligned so as to direct the infrared light of said first beam and said second beam, respectively. Specifically, the infrared light of said first beam is directed by the first plane mirror 104 towards the first cube corner mirror 106 and the infrared light of said second beam is directed by the second plane mirror 105 towards the second cube corner mirror 106. The first and second plane mirrors 104, 105 are assumed to be arranged and oriented symmetrically relative to the beam splitter 103. The angle of the first and second plane mirrors 104, 105 is such that the reflected infrared light travels parallel to the optical axis formed by both the first and second plane mirrors 104, 105 and the first and second cube corner mirrors 105, 106. The first and second plane mirrors 104, 105 may have fixed alignment.

Each of the first and second cube corner mirrors 106, 107 is formed of three plane mirrors perpendicular to each other and adapted to reflect infrared light back to the direction whence it came, independent of the incident angle. In other words, the incident angle relative to the optical axis is equal to the angle of the reflected infrared light rays relative to the optical axis. Specifically, the first cube corner mirror 106 is adapted to reflect infrared light of the first beam directed by the first plane mirror 104 to the first cube corner mirror 106 back to the first plane mirror 104. Subsequently, said reflected beam is reflected from the first plane mirror 104 to the beam splitter 103. Similarly, the second cube corner mirror 107 is adapted to reflect infrared light of the second beam directed by the second plane mirror 105 back to the second plane mirror 105 and subsequently via the second plane mirror 105 to the beam splitter 103. The first and second cube corner mirrors 106, 107 may have been manufactured using a replication process (e.g., a thin film epoxy replication process).

The first and second cube corner mirrors 106, 107 may form together a single component, that is, they may be fixed rigidly to each other. The first and second cube corner mirrors 106, 107 may be arranged back-to-back, preferably as close to each other as possible mechanically. The first and second cube corner mirrors 106, 107 are arranged on a common optical axis (corresponding to x-axis in the illustrated example) to reflect into opposite directions. Further, the first and second cube corner mirrors 106, 107 are movable back and forth along said common optical axis (either separately or at least together). By moving the first cube corner mirror 106, the path length of the beam travelling via the first plane mirror 104 to the first cube corner mirror 106 and back to the first plane mirror 104 is adjusted. Obviously, by moving the second cube corner mirror 107 the path length of the beam travelling via the second plane mirror 105 to the second cube corner mirror 107 and back to the second plane mirror 105 may be adjusted in a similar manner. To enable the functioning of the interferometer, either one of the first and second cube corner mirrors 106, 107 or both of the first and second cube corner mirrors 106, 107 (possibly fixed to each other) may be moved. The movement may be achieved using moving means such as motorized translation means or a moving coil. Said moving means may also be comprised in the first enclosed volume 111. The first and second cube corner mirrors 106, 107 (including said moving means) may be the only moving elements in the apparatus.

As described above, the beam splitter 103 splits the beams reflected back to it from the first and second plane mirrors 104, 105. Specifically, said returning beams are split so that, for each beam, one of the split beams (either a transmitted or a reflected beam) is directed towards a first focusing mirror 108 (of the aforementioned focusing unit). If the path lengths of the two beams reflected by the first and second cube corner mirrors 106, 107 are in phase (implying that the first and second cube corner mirrors 106, 107 arranged symmetrically relative to the beam splitter 103), said two beams interfere with each other constructively. However, if this is not the case, depending on the position of the first and/or second cube corner mirrors 106, 107 along the optical axis (or specifically the path lengths in said two arms of the interferometer relative to each other), the beams originating from the first cube corner mirror 106 and the second cube corner mirror 107 and transmitted to the first focusing mirror 108 may interfere with each other in different ways at different infrared frequencies. In other words, the output of the interferometer (i.e., magnitude of the output infrared signal) depends on the relative positions of the first and second cube corner mirrors 106, 107. The frequency (or wavelength) distribution of the infrared light may be measured based on the interference at different mirror displacements when the first and/or second cube corner mirrors 106, 107 are moved (i.e., based on an interferogram of the infrared light source with a sample). The interferometer comprising elements 101 to 107, thus, serves to modulate the infrared radiation of the infrared light source into a format, from which the spectral distribution of the infrared radiation may be calculated by means of Fourier transformation.

Figure 3A:
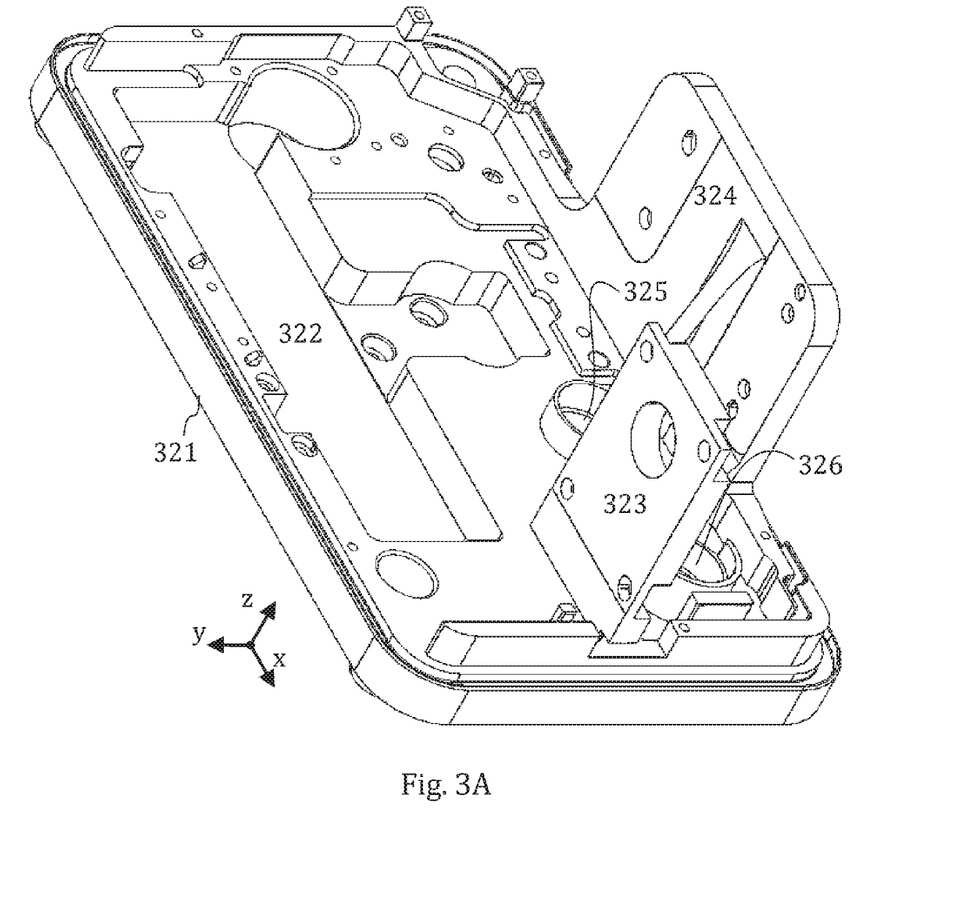
FIGS. 3A, 3B and 3C illustrate an exemplary mechanical layout of an apparatus according to embodiments from different angles.
Figure 3B:
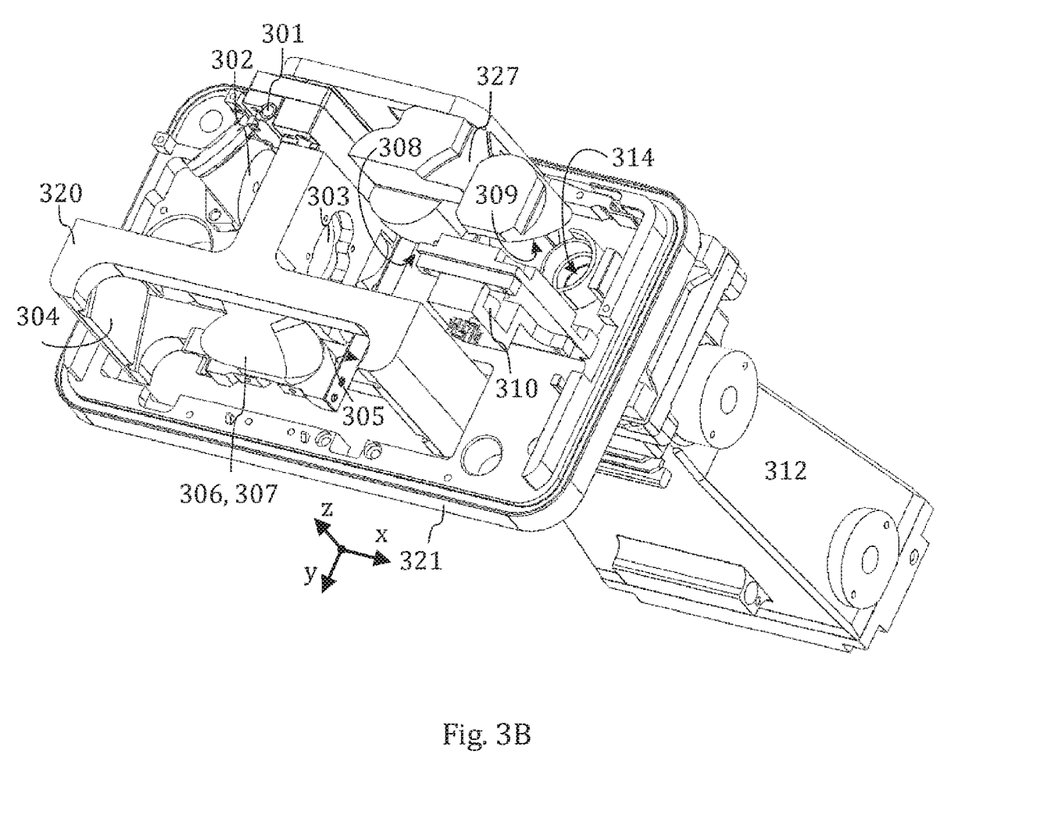
Figure 3C:
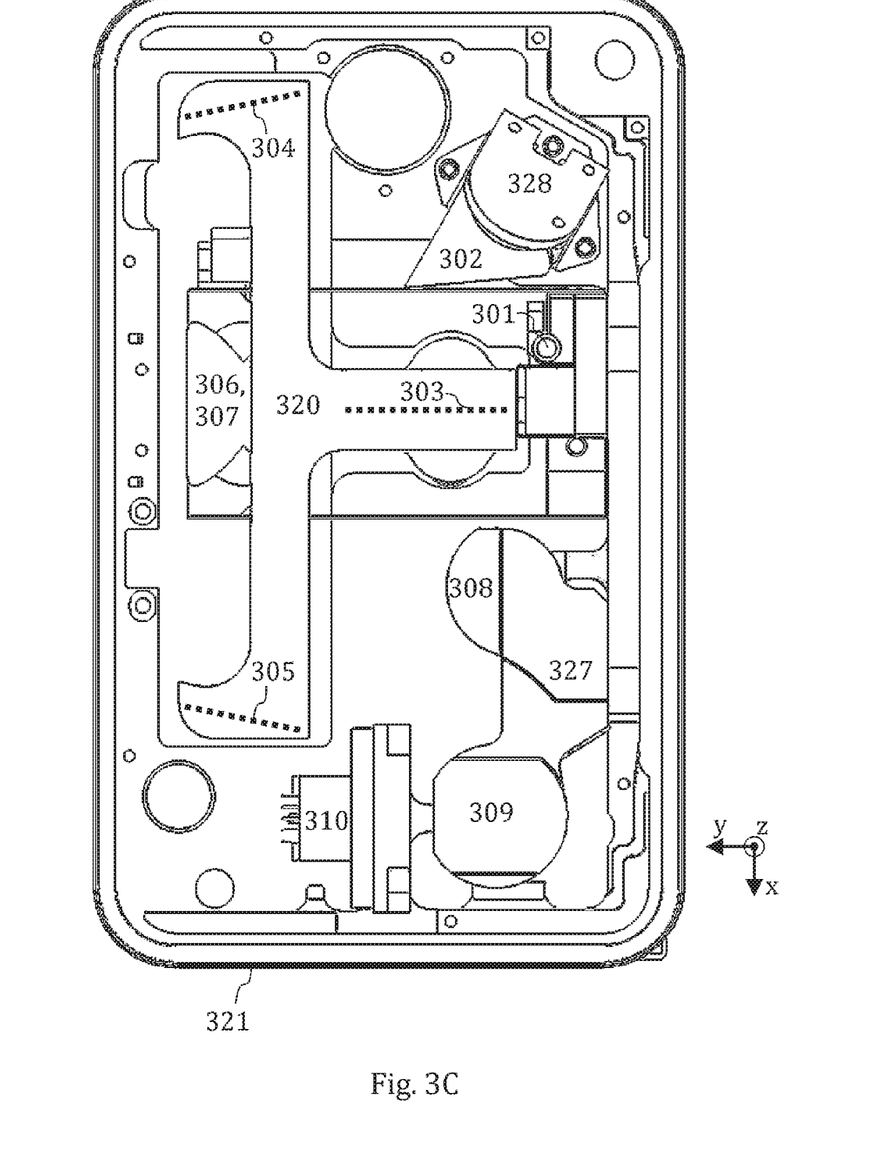

In some embodiments, the focusing unit comprising the first and second focusing mirrors 108, 109 may be a uniform piece of material on (or to) which the first and second focusing mirrors 108, 109 are mounted (or fixed). Specifically, the first and second focusing mirrors 108, 109 may have been machined directly onto said uniform piece of material (e.g., using diamond turning). Preferably, said uniform piece of material of the focusing unit is considerably massive and/or homogeneous. Said singular piece of material may be made of a metal such as brass or aluminium or an alloy such as steel. One example of such an embodiment is illustrated in FIGS. 3A, 3B and 3C which are to be discussed below in detail.

Figure 2:
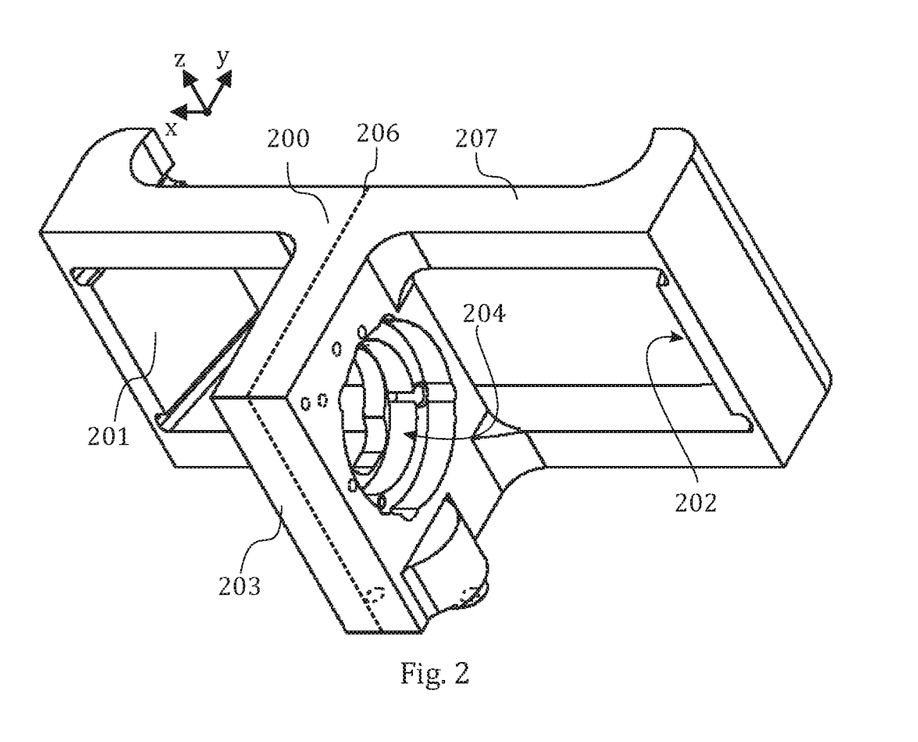
FIG. 2 illustrates a support structure according to embodiments.

In some embodiments, the interferometer may comprise a support structure holding (or supporting) the beam splitter 103 and on which the first and second plane mirrors 104, 105 are fixedly integrated. Specifically, the first and second plane mirrors 104, 105 may be thin-film-based structures and/or they may be fixedly integrated onto two opposing (inner) surfaces of the support structure. The support structure may be a massive structure made of, for example, metal or alloy. The term "fixedly integrated" is defined here and in the following so that if a first element is fixedly integrated on a second element, the first element is fixed or attached directly onto the surface of the second element so that it may not be detached from it without considerable effort and special tools. The detaching may require, for example, heating the support structure to a very high temperature, using chemical means and/or cutting and it may likely lead to damaging the first element and/or the second element. The first element, thus, becomes an integral or inseparable part of the second element after the integration. Further, the position or orientation of the first element which is fixedly integrated cannot be adjusted after the integration. The integration may be achieved, for example, using an adhesive of some kind (e.g., an epoxy). Specifically, the integration may be achieved using a replication process (e.g., a thin film epoxy replication process). Such embodiments are discussed in more detail below in relation to FIG. 2 showing an exemplary geometry of such a support structure.

The first focusing mirror 108 is adapted to focus infrared radiation received from the beam splitter 103 of the interferometer to an input infrared window 114 of the infrared absorption cell 112. As described above, said infrared radiation received from the beam splitter 103 may comprise two (interfering) beams, namely a first returning split beam which was reflected from a first cube corner mirror 106 via the first plane mirror 104 to the beam splitter 103 (and transmitted through it) and a second returning split beam which was reflected from the second cube corner mirror 107 via the second plane mirror 105 to the beam splitter 103 (and reflected from it). The first focusing mirror 108 may have (precision machined) permanently fixed alignment and it may be, for example, a parabolic mirror or an elliptical mirror. The machining may be carried out, for example, using diamond turning. The reflecting surface of the first focusing mirror 108 may be coated with metal (e.g., gold).

The infrared absorption cell 112 may be any known infrared (spectroscopic) absorption cell. Preferably, the infrared absorption cell 112 is a multipass absorption cell such as a White cell, a Herriott cell or a circular multipass cell. Multipass absorption cells are based on the concept of increasing the total path length of the infrared light travelling through the cell without increasing the size of the cell by causing the infrared beams to reflect back and forth multiple times within the absorption cell. A longer path length results, in general, in greater detection sensitivity. Multipass cells are especially useful for analyzing gases or liquids having weak spectra.

The infrared absorption cell 112 comprises an input and output infrared windows 114, 115 (i.e., infrared transparent or at least semi-transparent elements) for allowing infrared light to enter and leave the infrared absorption cell, respectively. The input and output infrared windows 114, 115 may be arranged on opposing ends of a (front) mirror separating the infrared absorption cell 112 from the first enclosed volume 111, as illustrated in FIG. 1B. The input and output infrared windows 114, 115 are sealed so as to keep the second enclosed volume (i.e., the sample cell gas volume) isolated from the first enclosed volume. These are the components that act as separator of the two gas volumes.

In the embodiment illustrated in FIGS. 1A and 1B, the infrared absorption cell is a White cell with fixed alignment mirrors 113, 116. A conventional White cell (which may be employed in other embodiments) comprises a front mirror and two back mirror arranged side by side opposite the front mirror with a small gap in between them. Having two back mirrors enables tuning the number of reflections by adjusting orientation and/or alignment of the two back mirrors. The illustrated White cell with fixed alignment mirrors 113, 116 has a somewhat simpler structure comprising a front mirror 113 and a back mirror 116, both having fixed (non-adjustable) alignment, orientation and curvature. The back mirror 116 may comprise two separate mirror surfaces diamond machined into a single piece of material. The front and back mirror 113, 116 are arranged so as to form a particular geometry of reflections, with specific path lengths. Preferably, a very large number of reflections occur within the White cell, as illustrated in FIG. 1B. The front mirror 113 comprises the input infrared window 114 and the output infrared window 115. In the illustrated example, the input and output infrared windows are arranged at different ends of the front mirror 113. The input and output infrared window 114, 115 act as sole infrared windows for the infrared absorption cell 112.

After a pre-determined number of reflections with the infrared absorption cell 112 (depending on the geometry and arrangement of the front and back mirrors 113, 116), infrared light penetrates through the output infrared window 115 of the infrared absorption cell 112 and hits a second focusing mirror 109. The second focusing mirror 109 is adapted to focus infrared radiation received from the infrared absorption cell 112 via the output infrared window 115 to the infrared detector 110. The second focusing mirror 109 may, similar to the first focusing mirror 108, have permanently fixed alignment and it may be, for example, an elliptical mirror or a parabolic mirror. The reflecting surface of the second focusing mirror 109 may be coated with metal (e.g., gold).

The infrared detector 110 is adapted to detect the infrared radiation focused on it by the second focusing mirror 109. The used infrared detector 110 may be any known infrared detector or infrared detector element. The infrared detector may be, for example, be a photonic infrared detector (i.e., an infrared photodetector). Infrared photodetectors are based on employing semiconductor materials with narrow band gaps for absorbing the incident infrared radiation, that is, for converting, using a p-n junction of the semiconductor, incident photons in the infrared range into current which is then collected by the measurement system. Alternatively, the infrared detection may be based on detection of thermal effects of the infrared radiation such as changes in resistance (bolometers and microbolometer), thermoelectric effect (thermocouples) or thermal expansion (Golay cells).

In some embodiments, the apparatus illustrated in FIGS. 1A and 1B may further comprise a purge gas source (or generator) adapted to provide a purging gas flow through the first enclosed volume 111. As all of the elements of the apparatus not within the infrared absorption cell (namely, elements 101 to 110) are arranged within said first enclosed volume 111, all of said elements 101 to 110 may be cleared of impurities simultaneously using the same purge gas source (e.g., a gas cylinder).

In some embodiments, the apparatus illustrated in FIGS. 1A and 1B may further comprise means (e.g., a heater) for controlling temperature in the second enclosed volume (i.e., in the infrared absorption cell 112). In such embodiments, it may be important not to allow the possible high temperature of the second enclosed volume to affect the temperature in the first enclosed volume 111 (at least not significantly) so as not deteriorate the performance of the interferometer and the detector 110 (e.g., due to thermal expansion). Thus, the apparatus may also comprise means (e.g., insulation foam) for thermally insulating the first enclosed volume 111 against temperature variations in the second enclosed volume (i.e., in the infrared absorption cell 112). It should be noted that the symmetrical structure of the spectrometer in itself causes mitigation of negative effects of temperature variations in the first enclosed volume 111 and thus separate means for thermally insulating the first enclosed volume 111 may not always necessary.

FIG. 2 illustrates a support structure for an interferometer according to an embodiment. The illustrated support structure may be employed with the apparatus described in relation to FIGS. 1A and 1B or specifically with the interferometer illustrated therein comprising elements 101 to 107. The x-, y- and z-axes in FIG. 2 correspond to the x-, y- and z-axes in FIGS. 1A and 1B, respectively. The support structure 200 may be mounted on a (massive) main frame plate of a spectrometer (extending along xy-plane), as will be discussed in detail in relation to FIGS. 3A, 3B and 3C.

Referring to FIG. 2, the support structure 200 has two functions. Firstly, the support structure 200 is adapted to (mechanically) hold or support a beam splitter 204 of an interferometer (rendered as transparent in FIG. 2). Secondly, first and second plane mirrors 201, 202 of the interferometer are fixedly integrated directly onto the support structure 200 (that is, onto a surface or surfaces of the support structure 200). The support structure 200, thus, connects the beam splitter 204 and the plane mirrors 201, 202 firmly together. Preferably, the support structure 200 is formed by one uniform piece of material and/or is considerably massive and/or homogeneous. The support structure may be made of one or more metals and/or alloys. The one or more metals may comprise, for example, one or more of copper, brass, aluminium and steel. Preferably, the support structure is made of a single material. In the following, the geometry and properties support structure 200 are discussed in more detail. It should be noted that only some of the elements of the mechanical assembly for mounting the beam splitter 204 are illustrated in FIG. 2 for clarity.

The support structure 200 comprises a rectangular frame 207 on which the first and second plane mirror 201, 202 are fixed and a mounting frame 203 for mounting the beam splitter 204. The mounting frame 203 (or at least the beam splitter 204 when mounted on the mounting frame 203) is arranged orthogonally to said rectangular frame 207 along its (central) plane of symmetry 206. The support structure 200 as a whole may be symmetric so that the plane of symmetry 206 of the mounting frame 203 is also a plane of symmetry for the whole support structure 200. In other words, the rectangular frame 207 extends along a direction orthogonal to the plane of symmetry 206 of the support structure 200 (that is, orthogonal to a central plane of the beam splitter 204) on both sides of the beam splitter 204 and further, preferably to a lesser extent, along a direction along the plane of symmetry (i.e., along z-direction in FIG. 2). In view of example of FIG. 2, the rectangular frame 207 is arranged along the xz-plane.

The mounting frame 203 protrudes orthogonally from the rectangular frame 207 (i.e., along −y-direction). The mounting frame 203 has an opening for enabling the operation of the beam splitter 204 (as described, e.g., in relation to FIGS. 1A and 1B) when mounted, that is, to enable infrared light to travel from the beam splitter 204 to the first and second plane mirrors 201, 202 and vice versa in an unhindered manner. The beam splitter 204 is fastened to the mounting frame 203 (or other mounting element) to prevent movement of the beam splitter 204 in an exact pre-defined position. The fastening may be achieved using any conventional mechanical fastening means such as (fastening) screws, (fine) adjustment screws, springs and/or spring plates. In some embodiments, said mechanical fastening means may allow (e.g., using adjustment screws) adjusting the position of the beam splitter 204 to tune the performance of the interferometer (e.g., during initial calibration of the spectrometer). As mentioned above, both the mounting frame 203 and the beam splitter 204 itself may be arranged along a plane of symmetry of the support structure 200.

The first and second plane mirrors 201, 202 are arranged symmetrically on opposing sides of the plane of symmetry 206 of the support structure 200 equidistant from it and facing it. Specifically, the first and second plane mirrors 201, 202 are fixedly integrated onto opposing inner surfaces of the rectangular frame 207. Said inner surfaces may be a CNC (Computer Numerical Control) machine-accurate surface. Said inner surfaces and consequently also the first and second plane mirrors 201, 202 are oriented at an angle relative to the plane of symmetry 206 (i.e., relative to the yz-plane) so as to enable infrared light to reflect from the first and second plane mirrors 201, 202 to the beam splitter 204 and vice versa. To enable fitting the first and second plane mirrors 201, 202 to said inner surfaces of the rectangular frame 207, the sections of the rectangular frame 207 which are parallel to the plane of symmetry 206 may be thicker than the sections of the rectangular frame which are orthogonal to the plane of symmetry 206.

The first and second plane mirrors 201, 202 may be manufactured directly onto the support structure (or specifically onto said opposing inner surfaces of the rectangular frame). Specifically, said manufacturing may be realized by polishing the metallic surface of the support structure so as to create the first and second plane mirrors 201, 202. Alternatively, the first and second plane mirrors 201, 202 may be manufactured by coating the surface of the support structure with a thin metal layer (e.g., a layer of gold).

Yet another option for manufacturing the first and second plane mirrors 201, 202 directly onto the support structure is using replication. Replication is a process of manufacturing optics by transferring an optical surface of a master (or mold) to one or more copies of the surface. Specifically, the replication process used may, in this case, be a thin film epoxy replication process. The thin film epoxy replication process may be carried out, for example, as follows. A master that contains the desired optical surface (that is, a flat surface in this case) is first manufactured. The master may be made of, for example, (polished) glass. As a first proper step of the thin film epoxy replication process, the master is coated with a release layer. The release layer is a layer adapted to permit successive layers of material to be easily pulled from the master later in the replication process. Subsequently, a dielectric film is deposited on the release layer and an aluminium coating (or other metal or conductive coating) is deposited on the dielectric film (preferably, in a vacuum coater).

In embodiments where replication is employed for manufacturing the first and second plane mirrors 201, 202, the (CNC-machined) surface of the support structure acts as the substrate for the replication (i.e., the surface on which the mirror is to be deposited) and the thin film epoxy replication process may be carried, for example, out as follows. A liquid epoxy is poured either onto the optical surface (i.e., the aluminium coated surface) of the master or onto the machined surface of the support structure and the two are bonded together. After the epoxy has cured, the master is separated from the created replica, transferring the thin film formed by the aluminium coating and the dielectric film onto the surface of the support structure. As a final step, the release layer may be cleaned from the support structure and the excess epoxy may be trimmed from around the edges of the replicated surface. The end result (i.e., the plane mirror) of the thin film epoxy replication process is, thus, a thin film of aluminium (or other metal) over-coated with a dielectric film providing protection for the metal) formed onto the surface of the support structure. In other embodiments, other variations of the (thin film epoxy) replication process may be employed.

By constructing the first and second plane mirrors 201, 202 as integral parts of the support structure 200 that holds the beam splitter 204, significant benefits may be attained compared to conventional solutions where plane mirrors of the interferometer are typically glass substrate or metal mirrors that are supported by complicated assemblies of mechanical components. By integrating the plane mirrors to the support structure, unwanted movements of the plane mirrors are eliminated that in the aforementioned traditional assembly often cause problems to the optical alignment. In said traditional assembly, the plane mirrors may be fastened in place, for example, using screws. The exact alignment of the plane mirrors is extremely critical for the correct operation of the spectrometer. However, no matter how tightly said screws are initially fastened, the alignment of the plane mirrors may still often change during the lifetime of the spectrometer so that a significant change in the positioning of the plane mirrors is caused. Consequently, if the interferometer in question is used in a spectrometer for analyzing gasses, the analysis of the sample gas may fail or at least provide inaccurate results. Because of different temperature expansion coefficients of the materials used in the prior art support structures, relatively large mass of the supported components, contamination on the surfaces and other factors, trying to keep the plane mirrors in place accurately against their frames is very demanding using the conventional solution with glass substrate mirrors supported by complicated assembly of mechanical components. Said problems in the optical alignment in the conventional solution are typically overcome by adjusting (periodically) the alignment of one or more other elements of the spectrometer (e.g., the beam splitter) to compensate for the changes in the plane mirrors. Such manual fine-tuning is typically needed, for example, in order to calibrate the interferometer (or spectrometer) for operation. The manual fine-tuning is very time-consuming and requires considerable expertise from the person performing the fine-tuning to achieve a satisfactory result. Therefore, the claimed solution serves to facilitate the calibration process of the spectrometer.

FIGS. 3A, 3B and 3C illustrate an exemplary mechanical layout of an apparatus (a spectrometer or a gas analyzer) according to embodiments. Specifically, FIG. 3A shows a main frame plate of the spectrometer in isolation in a perspective view while FIGS. 3B and 3C show the whole spectrometer in a perspective view and from above, respectively. The illustrated spectrometer may correspond to the spectrometer of FIGS. 1A and 1B. Specifically, elements 301-310, 312, 314 of FIGS. 3A, 3B and 3C may correspond to elements 101-110, 112, 114 of FIGS. 1A and 1B, respectively. Further, elements 320, 305, 304, 303 of FIGS. 3B and 3C may correspond to elements 200, 201, 202, 204 of FIG. 2, that is, the support structure of FIG. 2 may be the same one shown in FIGS. 3B and 3C. The x-, y- and z-axes in FIGS. 3A, 3B and 3C correspond to the x-, y- and z-axes in any of FIGS. 1A, 1B and 2, respectively. In FIG. 3C, dotted line is used to represent geometry obstructed from view by other objects.

In FIGS. 3A, 3B and 3C, the element 327 is a focusing unit which is a uniform piece of material to which the first and second focusing mirrors 308, 309 are fixed. Specifically, in the illustrated spectrometer the first and second focusing mirrors 308, 309 are fixed to the underside of said uniform piece of material so as to, respectively, focus the incident infrared light received from the beam splitter 303 to the infrared absorption cell 312 and focus the incident infrared light received from the infrared absorption cell 312 to the infrared detector 310. Specifically, infrared light is transmitted to and received from the infrared absorption cell 312 via the openings 325, 326 leading to the input and output infrared windows 314, respectively. The first and second focusing mirror 308, 309 may have been machined directly onto said uniform piece of material, for example, using diamond turning.

While most of the elements illustrated in FIGS. 3A, 3B and 3C have been discussed at length in relation to above embodiments (and thus detailed discussion regarding said elements is not repeated here), the main frame plate 321 of the apparatus, being the central element of the mechanical layout, has not been discussed above. The main frame plate 321 is illustrated before said mounting in FIG. 3A and after said mounting in FIGS. 3B and 3C. The main frame plate 321 is adapted to allow mounting of the elements 301-310 (that is, elements in the first enclosed volume as defined in relation to above embodiments) on it. The main frame plate 321 is further adapted to be fixed to the infrared absorption cell 312 which is arranged on an opposing side of the main frame plate 321 compared to said elements 301-310, 320, 327, 328 to be mounted. In other words, while the elements 301-310 are mounted on the main frame plate 321, the infrared absorption cell is fixed under it (i.e., on the opposing side). The main frame plate 321 may have a significantly large mass (compared to, e.g., mounted elements 301-310). Due to said large mass of the main frame plate 321, a center of gravity the spectrometer may be located within the main frame plate 321 or at least in close proximity of the main frame plate (e.g., closer to the main frame plate 321 than to the center of the infrared absorption cell 312). The main frame plate 321 may also be heavier or at least roughly the same weight as the infrared absorption cell 312. The main frame plate 321 may be made of any suitably massive metal or alloy. In an embodiment, the main frame plate 321 is made of aluminium. The main frame plate 321 may consist of a single piece or multiple (interconnected) pieces.

The main frame plate 321 may comprise at least one opening 325, 326 coinciding with the input and output infrared windows 314 of the infrared absorption cell 312. In the illustrated example, two separate openings 325, 326 are provided, one for each of the input and output infrared windows 314.

While some of the elements 301-310 may be mounted directly on a flat surface of the main frame plate 321, in other cases the main frame plate may need to be adapted so as achieve correct alignment of the elements 301-310 when mounted. To this end, the main frame plate 321 may comprise one or more cavities (or recesses) adapted to receive one or more of the elements 301-310, 320, 327, 328 to be mounted. In the illustrated example, one such cavity 322 is provided for receiving the support structure 320 holding the beam splitter 303 and onto which the first and second plane mirrors 304, 305 are fixedly integrated. In addition or alternatively, the main frame plate 321 may comprise one or more fixed mounting elements protruding from the main frame plate 321. In the illustrated example, three such mounting elements are provided: a first mounting element 323 for mounting the focusing unit 327 and the infrared light source 301, a second mounting element 324 for mounting the infrared detector 310 and a third mounting element 328 for mounting the collimating mirror 302.

A cover or a casing (not shown in FIGS. 3A, 3B and 3C) may be fixed (preferably detachably fixed) onto the main frame plate 321 so to as to fully enclose the mounted elements 301-310 and to thus form a first enclosed volume, as defined in relation above embodiments. Compared to conventional solutions where the elements of the spectrometer are arranged in sequential chain on top of a main frame plate, the back-to-back arrangement of elements used in the embodiments discussed above enables a more compact design for the spectrometer or gas analyzer. Further, the back-to-back arrangement of elements on opposing sides of the main frame plate further serves to minimize the effects of temperature variations and vibrations.

While the embodiments were described above assuming that the operational frequencies of the spectrometer fall within the infrared range, in other embodiments another frequency range may be employed. For example, a spectrometer according to embodiments may be adapted operate in a frequency range comprising, fully or partly, one or more of the ultraviolet frequency range, frequency range of visible light, the infrared frequency range and near infrared (NIR) frequency range. In other words, the infrared light source of the interferometer may, in general, be a source of electromagnetic radiation producing electromagnetic radiation in a particular frequency range and the elements of the spectrometer (i.e., the different mirrors, the beams splitter, the absorption cell and its input and output windows and the detector) may be elements adapted to operate at said particular frequency range.

Even though the invention has been described above with reference to examples according to the accompanying drawings, it is clear that the invention is not restricted thereto but it can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways.

The invention claimed is:
1. A spectrometer comprising:
an interferometer comprising a source of electromagnetic radiation, wherein the interferometer is contained in a first enclosed volume;
a first focusing mirror contained in the first enclosed volume and configured to focus electromagnetic radiation received directly from the interferometer;
a multipass absorption cell forming a second enclosed volume for containing a sample gas, wherein the second enclosed volume of the multipass absorption cell is isolated from the first enclosed volume so as to prevent gas flow between the first enclosed volume and the second enclosed volume and the multipass absorption cell comprises an input window configured to receive electromagnetic radiation from the first focusing mirror and an output window configured to output electromagnetic radiation from the multipass absorption cell, wherein the electromagnetic radiation focused by the first focusing mirror is focused directly to the input window;
a second focusing mirror contained in the first enclosed volume configured to focus electromagnetic radiation received directly from the multipass absorption cell via the output window, wherein the first focusing mirror and the second focusing mirror are comprised in a focusing unit formed as a uniform piece of material, the first and second focusing mirrors having been machined directly onto said uniform piece of material;
a detector contained in the first enclosed volume configured to detect electromagnetic radiation focused by the second focusing mirror, wherein the electromagnetic radiation focused by the second focusing mirror is focused directly to the detector; and
a main frame plate on which elements in the first enclosed volume are mounted, wherein said elements comprise the interferometer, the first focusing mirror, the second focusing mirror and the detector and the main frame plate is fixed to the multipass absorption cell arranged on an opposing side of the main frame plate to said elements in the first enclosed volume and comprises at least one opening coinciding with the input and output windows of the multipass absorption cell so as to enable the focusing of the electromagnetic radiation by the first focusing mirror via the input window to the multipass absorption cell and the outputting of the electromagnetic radiation from the multipass absorption cell via the output window to the second focusing mirror.

2. The spectrometer of claim 1, wherein the multipass absorption cell is a White cell having a front and a back mirror with fixed alignment and orientation, wherein the input and output windows are comprised in the front mirror.

3. The spectrometer according to claim 1, further comprising:
a cover detachably fixed to the main frame plate and forming with it the first enclosed volume.

4. The spectrometer according to claim 1, further comprising:
a purge gas source configured to provide a purge gas flow through the first enclosed volume.

5. The spectrometer according to claim 1, further comprising:
means for controlling temperature in the second enclosed volume; and/or
means for thermally insulating the first enclosed volume from the second enclosed volume.

6. The spectrometer according to claim 1, wherein the interferometer further comprises:
a beam splitter configured to split electromagnetic radiation from the source of electromagnetic radiation to a first beam and a second beam;
a first plane mirror configured to direct the first beam;
a second plane mirror configured to direct the second beam;
a first cube corner mirror formed of three plane mirrors perpendicular to each other configured to reflect the first beam directed by the first plane mirror back to the first plane mirror and subsequently via the first plane mirror and the beam splitter to the first focusing mirror;
a second cube corner mirror formed of three plane mirrors perpendicular to each other configured to reflect the second beam directed by the second plane mirror back to the second plane mirror and subsequently via the second plane mirror and the beam splitter to the first focusing mirror, wherein the first and second cube corner mirrors are arranged on a common optical axis to reflect into opposite directions and movable back and forth in the direction of said common optical axis.

7. The spectrometer of claim 6, wherein the interferometer further comprises:
a collimating mirror configured to collimate electromagnetic radiation from the source of electromagnetic radiation and direct it to the beam splitter.

8. The spectrometer of claim 6, wherein the interferometer further comprises:
a support structure holding the beam splitter, wherein the support structure is made of a uniform piece of material and each of the first and second plane mirrors is fixedly integrated directly onto a surface of the support structure.

9. The spectrometer of claim 8, wherein the support structure is symmetrical so that the beam splitter is arranged along a plane of symmetry of the support structure and the first and second plane mirrors are arranged symmetrically on opposing sides of the plane of symmetry equidistant from it and facing it.

10. The spectrometer according to claim 9, wherein the support structure comprises a rectangular frame extending along a direction orthogonal to the plane of symmetry on both sides of the beam splitter, the first and second plane mirrors being fixedly integrated onto opposing inner surfaces of the rectangular frame.

11. The spectrometer according to claim 1, wherein the spectrometer is configured to operate at infrared frequencies so that at least the source of electromagnetic radiation is an infrared light source, the multipass absorption cell is an infrared absorption cell, the input window is an input infrared window, the output window is an output infrared window and the detector is an infrared detector.

* * * * *